(12) United States Patent
Ro et al.

(10) Patent No.: US 10,128,545 B2
(45) Date of Patent: Nov. 13, 2018

(54) BATTERY PACK

(71) Applicant: SAMSUNG SDI CO., LTD., Yongin-si, Gyeonggi-do (KR)

(72) Inventors: Hun Tae Ro, Yongin-si (KR); Su Sang Cho, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 194 days.

(21) Appl. No.: 14/955,585

(22) Filed: Dec. 1, 2015

(65) Prior Publication Data

US 2016/0329606 A1 Nov. 10, 2016

(30) Foreign Application Priority Data

May 6, 2015 (KR) .................. 10-2015-0063219

(51) Int. Cl.
*H01M 10/42* (2006.01)
*H01M 2/10* (2006.01)

(52) U.S. Cl.
CPC ....... *H01M 10/425* (2013.01); *H01M 2/1055* (2013.01); *H01M 2010/4271* (2013.01)

(58) Field of Classification Search
CPC ............. H01M 10/425; H01M 2/1055; H01M 2010/4271
See application file for complete search history.

(56) References Cited

U.S. PATENT DOCUMENTS

| | | | |
|---|---|---|---|
| 8,623,536 B2 | 1/2014 | Jeon et al. | |
| 2007/0111087 A1* | 5/2007 | Tsai | H01M 2/105 429/100 |
| 2010/0047676 A1* | 2/2010 | Park | H01M 2/105 429/93 |
| 2010/0086845 A1* | 4/2010 | Jung | H01M 2/0215 429/178 |
| 2012/0003505 A1 | 1/2012 | Kim | |

FOREIGN PATENT DOCUMENTS

| | | |
|---|---|---|
| KR | 10-2006-0037599 | 5/2006 |
| KR | 10-2012-0002874 | 1/2012 |
| KR | 10-2014-0027751 | 3/2014 |

* cited by examiner

*Primary Examiner* — Osei K Amponsah
(74) *Attorney, Agent, or Firm* — Lee & Morse, P.C.

(57) ABSTRACT

A battery pack has a case which includes accommodating areas for battery cells located between and printed circuit boards (PCBs). Each PCB has openings that correspond to respective accommodating areas. The battery pack also has tabs connected to the battery cells through the openings in the PCBs. First ends of pattern portions of a first PCB are connected to respective tabs of the first PCB, and second ends of the pattern portions are at a first pattern collecting portion in the case. First ends of pattern portions of a second PCB are connected to respective tabs corresponding to the second PCB, and second ends of the pattern portions of the second PCB are at a second pattern collecting portion in the case. A battery management system is connected to the batteries through the first and second PCBs.

18 Claims, 4 Drawing Sheets

BATTERY PACK

CROSS-REFERENCE TO RELATED APPLICATION

Korean Patent Application No. 10-2015-0063219, filed on May 6, 2015, and entitled, "Battery Pack," is incorporated by reference herein in its entirety.

BACKGROUND

1. Field

One or more embodiments described herein relate to a battery pack.

2. Description of the Related Art

Battery cells are used to power mobile devices, electric vehicles, hybrid vehicles, and other electrical systems. The shape, configuration, and/or capacity of battery cells may differ, for example, depending on the kind of device to be powered. For example, a single battery cell may be used to power a compact mobile device (e.g., a cellular phone), at least for a predetermine time. However, a larger capacity battery module equipped with multiple battery cells may be used to power an electric or hybrid vehicle, which have higher power and driving time requirements.

SUMMARY

In accordance with one or more embodiments, a battery pack includes a plurality of battery cells; a case having accommodating areas for the battery cells; first and second printed circuit boards (PCBs) at respective upper and lower portions of the case, each of the first and second PCBs having openings corresponding to respective ones of the accommodating areas; a plurality of tabs connected to the battery cells through the openings in the first and second PCBs; and a battery management system on a side surface of the case, wherein the first and second PCBs include pattern portions and wherein: first ends of the pattern portions of the first PCB are connected to respective ones of the tabs corresponding to the first PCB and second ends of the pattern portions of the first PCB are at a first pattern collecting portion at the side surface of the case, and first ends of the pattern portions of the second PCB are connected to respective ones of the tabs corresponding to the second PCB and second ends of the pattern portions of the second PCB are at a second pattern collecting portion at the side surface of the case.

Each of the tabs may include a base portion contacting a respective one of the battery cells, at least one connecting portion extending from a circumference of the base portion, and a flange portion extending from the at least one connecting portion in a different direction and to be mounted on the a respective one of the first or second PCBs.

The battery pack may include soldering portions connected to respective ones of the flange portions, wherein the first ends of the pattern portions and corresponding ones of the tabs are electrically connected by the soldering portions, respectively. The openings of the first and second PCBs may be substantially equal to or greater than sizes of the base portion of each of the tabs. The BMS may have connectors electrically connected to respective ones of the pattern collecting portions. The connectors may be at upper and lower portions of the BMS, respectively.

The battery pack may include extending portions respectively extending at predetermined lengths along circumferences of upper and lower surfaces of the case. Circumferences of the upper and lower surfaces of the case may include guide areas for respective ones of the pattern collecting portions. The openings in each of the first and second PCBs may have different sizes based on polarities of corresponding ones of the battery cells. The openings corresponding to positive polarity may be smaller than the openings corresponding to negative polarity.

In accordance with one or more other embodiments, a battery pack includes a case; a plurality of battery cells; a plurality of first contacts; a plurality of second contacts; a battery management system (BMS); a first circuit board connected to first terminals of the battery cells through the first contacts, the first circuit board connected to the BMS; a second circuit board connected to second terminals of the battery cells through the second contacts, the second circuit board connected to the BMS, wherein the battery cells, the first and second circuit boards, the first and second contacts, and the BMS are in the case.

A surface of the first circuit board and an outer surface of a rim of the case may be substantially coplanar. The first circuit board may have a plurality of first holes, the first contacts may be coupled to respective ones of the first holes, and the first contacts may connect conductive lines on the first circuit board to respective ones of the first terminals of the battery cells. The first holes may have substantially equal size. The first holes may have different sizes.

The battery pack may include a connector coupled to one of the BMS or the conductive lines on the first circuit board; and pins connected to the other of the BMS or the conductive lines on the first circuit board and coupled to the connector. The printed circuit board may have an extension, the extension may include one of the pins or the connector; and the extension may be coupled to a recess in a circumference in the case. The second circuit board may have a plurality of second holes, the second contacts may be coupled to respective ones of the second holes, and the second contacts may connect conductive lines on the second circuit board to respective ones of the second terminals of the battery cells.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
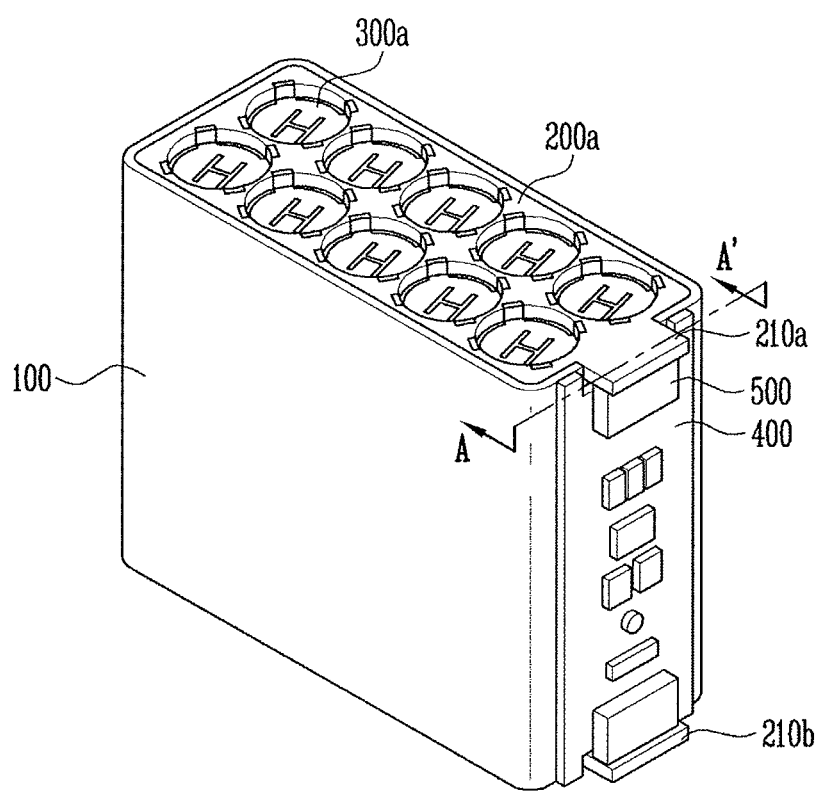
FIG. 1 illustrates an embodiment of a battery pack.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
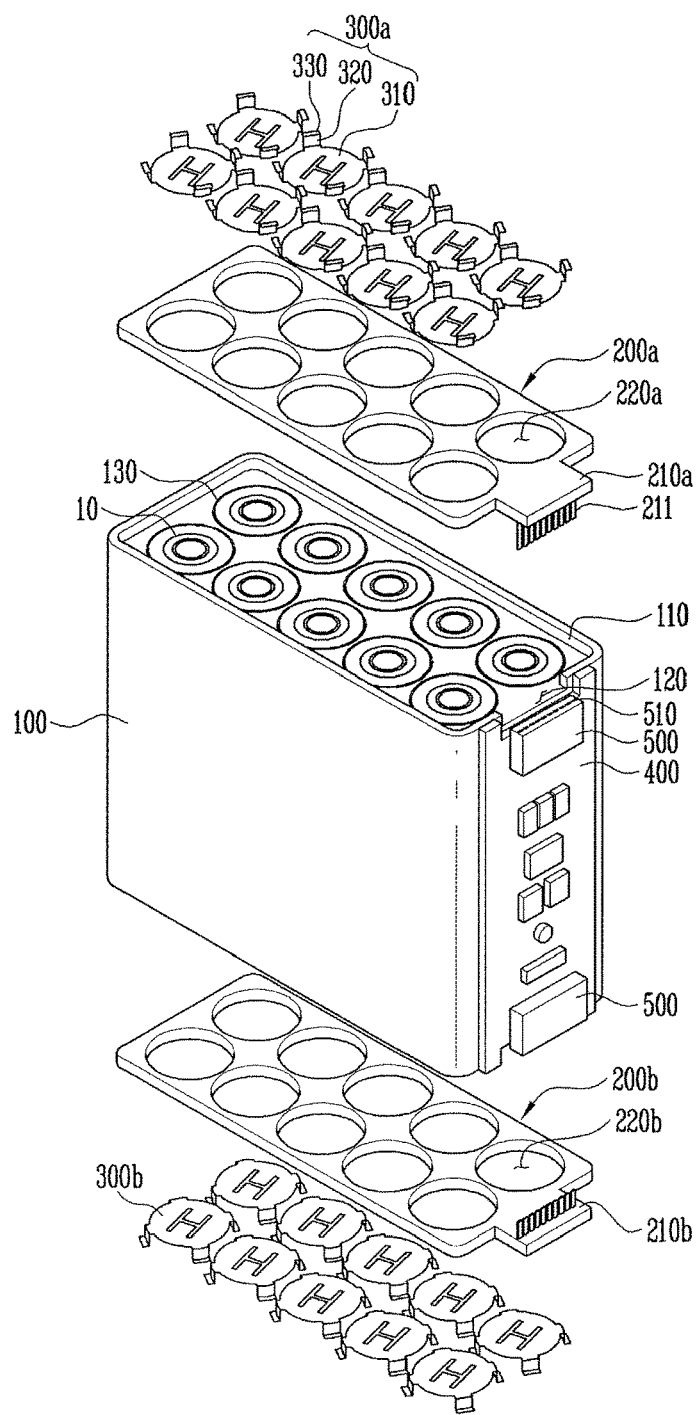
FIG. 2 illustrates an exploded view of the battery pack.

FIGS. 1 and 2 illustrate an embodiment of a battery pack which includes a plurality of battery cells 10, a case 100 including the battery cells 10, printed circuit boards (PCBs) 200a and 200b at upper and lower portions of the case 100, tabs or contacts 300a and 300b connected to the battery cells 10, and a battery management system 400 on one side surface of the case 100.

The case 100 includes a predetermined number of battery cells 10. In the embodiment illustrated in FIGS. 1 and 2, ten cylindrical battery cells 10 are arranged in 2 columns and 5 rows. The case 100 also includes accommodating portions 130 for the battery cells 10. The PCBs 200a and 200b are at the upper and lower portions of the case 100, respectively, and are provided with openings 220a and 220b in areas corresponding to the accommodating portions 130.

The tabs 300a and 300b are connected to the battery cells 10 through openings 220a and 220b in respective ones of the PCBs 200a and 200b. The PCBs 200a and 200b include pattern portions 240 (see, e.g., FIG. 3) to connect respective ones of the battery cells 10 to the BMS 400.

The PCBs 200a and 200b further include pattern collecting portions 210a and 210b that extend, for example, upwardly from the one side surface of the case 100, e.g., the side on which the BMS 400 is positioned. The pattern collecting portions 210a and 210b are electrically connected to respective connectors 500 of the BMS 400. The connectors 500 are positioned at upper and lower portions of the BMS 400 and face respective ones of the pattern collecting portions 210a and 210b.

The case 100 further includes extending portions 110 respectively extends in upward and downward directions at predetermined lengths. The extending portions 110 are located along circumferences (or rims) of respective ones of the upper and lower surfaces of the case 100. The lengths of the extending portions 110 may equal the thicknesses of the PCBs 200a and 200b, so that the extending portions 110 surround circumferences of the PCBs 200a and 200b. The extending portions 110 allow the PCBs 200a and 200b to be mounted at accurate positions in the case 100.

The pattern collecting portions 210a and 210b protrude from one side surface of the case 100. Guide portions 120 (e.g., recesses) in the extending portions 110 are formed at circumferences of the upper and lower surfaces of the case 100, on which the pattern collecting portions 210a and 210b are respectively mounted. The guide portions 120 have lengths which, for example, correspond to widths of the pattern collecting portions 210a and 210b, respectively. The guide portions 120 guide and fix the positions of the pattern collecting portions 210a and 210b, respectively. Because the pattern collecting portions 210a and 210b are fixed, the pattern collecting portions 210a and 210b may be more easily connected to respective connectors 500 of the BMS 400.

The tabs 300a and 300b are connected to the battery cells 10 through the openings 220a and 220b. The tabs 300a and 300b are respectively positioned at upper and lower portions of the case 100 and may have the same shape.

The tab 300a has a plurality of base portions 310 and a plurality of connecting portions 320 and flanges portion 330 for each base portion 310. The base portion 310 contacts an upper surface of respective battery cells 10 and has, for example, a circular shape. The size of the openings 220a of the PCB 200a may be equal to or greater than the size of the base portions 310 of tab 300a. Accordingly, the tab 300a may be mounted on upper surfaces of the battery cells 10 by penetrating the openings 220a. The battery cells 10 and respective ones of the base portions 310 may be coupled to each other, for example, by welding.

The connecting portions 320 extend to bend upward from the circumference of the base portions 310. The number of connecting portions 320 for each base portion 310 may vary for different embodiments. For example, four connecting portions 320 may extend from each base portion 310 at spaced intervals. The length of the connecting portion 320 may be, for example, equal to the thickness of the PCB.

The flange portions 330 are bent relative to the connecting portions 320s. Soldering portions 230 (see, e.g., FIG. 3) may be formed at the PCB on which the flange portions 330 are mounted. For example, the flange portions 330 are mounted on the soldering portions 230 to be soldered. Thus, the flange portions 330 may be electrically connected to the soldering portions 230.

In one type of battery pack, a BMS and a battery module are connected to each other by a monitoring wire, and the BMS and the battery module are in a case. In such a battery pack, interference (e.g., frictional contact) may occur between the case and the monitoring wire. The interference may strip the coating of the monitoring wire. As a result, a short circuit may form between the case and the monitoring wire.

In accordance with one or more embodiments, a pattern is formed on the PC and connecting tabs are soldered to the PCB. Therefore, a monitoring wire is not used and thus a soldering process is not required to be performed. As a result, the manufacturing process for the battery pack may be simplified and working efficiency may be improved. Moreover, a short circuit caused by interference between a monitoring wire and the case is prevented, thereby improving stability and reliability of the battery pack.

Figure 3:
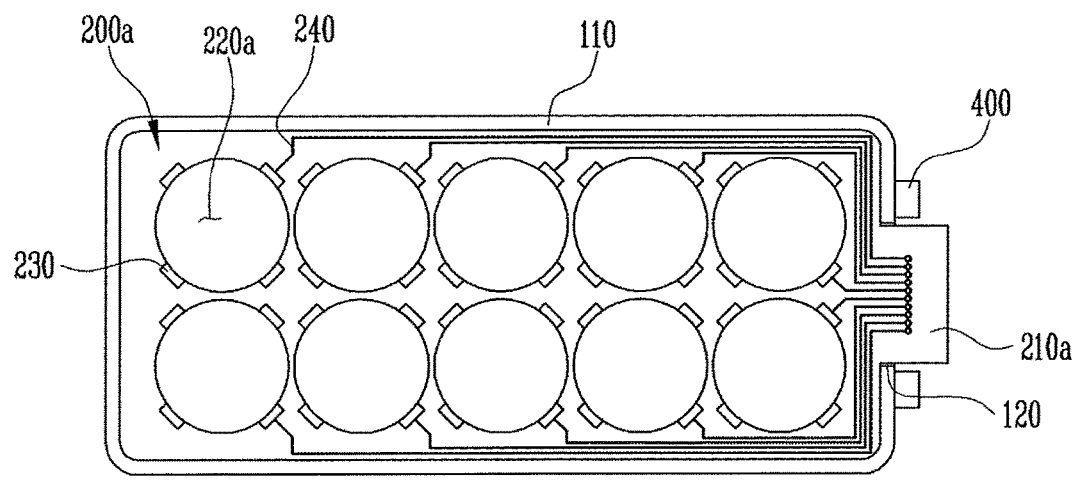
FIG. 3 illustrates an embodiment of patterns on a printed circuit board.
Figure 4:
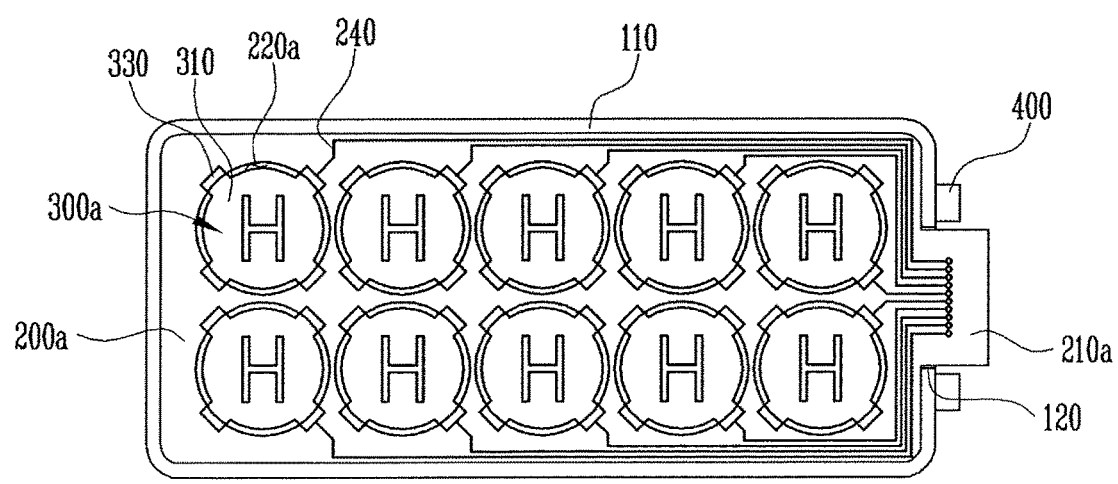
FIG. 4 illustrates an example of tabs of the printed circuit board.

FIG. 3 illustrates examples of patterns formed on the PCB 200a of the battery pack, and FIG. 4 illustrates an example where tabs are mounted at an upper portion of the PCB 200a in FIG. 3. The PCB 200b of the battery pack and its attendant features may be similar or analogous to those illustrated in FIGS. 3 and 4.

Referring to FIGS. 3 and 4, pattern portions 240 connect the battery cells 10 and the BMS 400 to each other and are formed on the PCB 200a. First ends of the pattern portions 240 are connected to soldering portions 230 formed at a predetermined distance along circumferences of the openings 220a of the PCB 200a. Second ends of the pattern portions 240 are positioned at the pattern collecting portion 210a. The pattern portions 240 extend to the pattern collecting portion 210a from the soldering portions 230 disposed along the circumferences of the openings 220a. Accordingly, the battery cells 10 are individually connected to the BMS 400. In one embodiment, four soldering portions 230 are spaced at a predetermined distances along the circumference of each opening 220a. The number and positions of the soldering portions 230 may be different in another embodiment. The pattern collecting portion 210a includes via holes 250 (see, e.g., FIG. 5) where the second ends of the pattern portions 240 are located.

Referring to FIG. 4, the connecting tabs 300a are mounted on upper surfaces of respective ones of the battery cells 10. Each connecting tabs 300a includes base portion 310 which contacts a respective battery cell 10 and at least one connecting portion 320 bent upwardly from a circumference of the base portion 310. At least one flange portion 330 is bent from each connecting portion 320 for mounting on the PCB 200a.

The flange portion 320 may be the soldering portion 230 for soldering. Accordingly, each battery cell 10 and soldering portion 230 may be electrically connected to each other, e.g., each battery cell 10 mat be electrically connected to the first end of the pattern portion 240 positioned at the soldering portion 230.

As previously noted, the pattern portions 240 have first ends connected to respective battery cells 10 and second ends positioned at the pattern collecting portion 210a for connection to the BMS 400. The pattern collecting portion 210a extends from the side surface of the case 100, e.g., the same side on which the BMS 400 is positioned. The connector 500 (see, e.g., FIG. 5) is on a surface of the BMS 400 at a location corresponding to the pattern collecting portion 210a.

Patterns are additionally formed on the PCB 200a to allow the battery cells 10 to be connected in series or parallel. For example, patterns may be included to connect the soldering portions 230 corresponding to one opening 220a to the soldering portions 230 corresponding to another opening 220a, in order to establish the series or parallel connections. The battery cells 10 may be connected in series or parallel, for example, according to directions in which the battery cells 10 are inserted into the accommodating portions 130 of the case 100.

Patterns on the PCB 200b positioned on the lower portion of the battery cells 10 may be analogously formed. Also, a high-current terminal may be formed at one or both of the PCBs 200a or PCB 200b.

Figure 5:
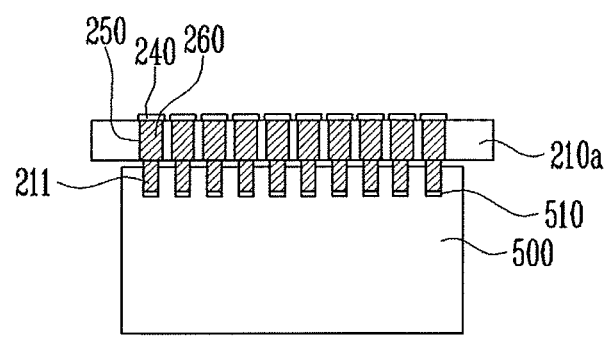
FIG. 5 illustrates a view along section line A-A' in FIG. 1.

FIG. 5 is a sectional view taken along line A-A' in FIG. 1. Referring to FIG. 5, the second ends of the pattern portions 240 are positioned at the pattern collecting portion 210a of the PCB 200a. Via holes 250 are formed at locations of the second ends of the pattern portions 240. The via holes 250 are filled with a conducting material to electrically connect the second ends of the pattern portions 240 to the connector 500. In another embodiment, the via holes 250 may be formed in one area of the pattern portions 240, and a pattern extending up to the pattern collecting portion 210a from the one area having the via holes 250 formed therein may be additionally formed on the lower surface of the PCB 200a. Accordingly, the second ends of the pattern portions 240 may be positioned at the pattern collecting portion 210a.

A plurality of pins 211 may protrude from areas in which the second ends of the pattern portions 240 are positioned. The pins 211 may be formed on the lower surface of the pattern collecting portion 210a. The connector 500 of the BMS 400 (see, e.g., FIG. 2) faces the lower surface of the pattern collecting portion 210a. A plurality of groove portions 510 are formed at respective positions corresponding to the pins 211 of the pattern collecting portion 210a in the connector 500. The battery cells 10 are connected to the BMS 400 through the pins 211 of the pattern collecting portion 210a inserted into the groove portion 510 of the connector 500. Thus, the battery cells 10 are connected to the BMS 400 by the pattern portions 240.

The connectors 500 are positioned at the upper and lower portions of the BMS 400. The connector 500 positioned at the lower portion of the BMS 400 may be formed identically to the connector 500 at the upper portion, as described above.

Figure 6:
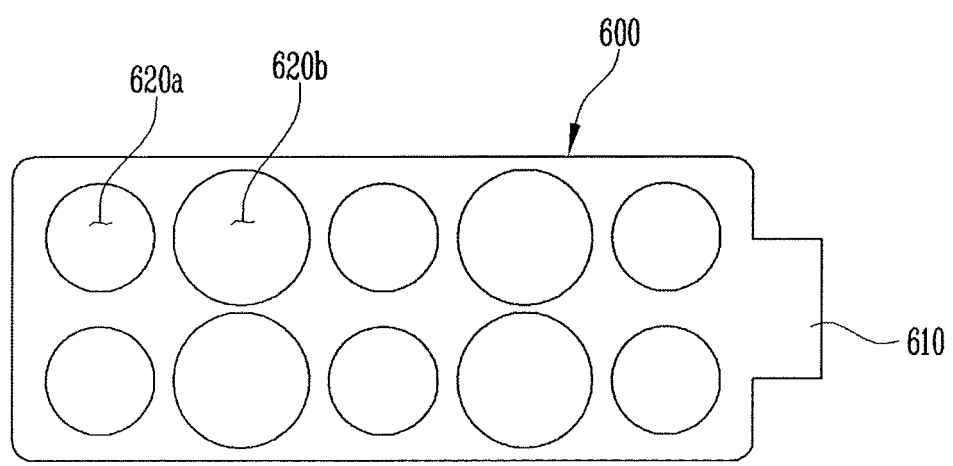
FIG. 6 illustrates another embodiment of a printed circuit board.

FIG. 6 illustrates another embodiment of PCBs 600 which may replace PCBs 200a and 200b. Each PCB 600 includes openings 620a and 620b having different sizes based, for example, on polarities of the battery cells 10, e.g., the sizes of the openings 620a and 620b corresponding to positive and negative polarities of the battery cell 10 may be different. The openings 620a corresponding to the positive polarity of the battery cells 10 may be smaller than the openings 620b corresponding to the negative polarity of the battery cells 10. This size difference may prevent erroneous insertion of the battery cells 10.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A battery pack, comprising:
   a plurality of battery cells;
   a case having accommodating areas for the battery cells;
   first and second printed circuit boards (PCBs) at respective upper and lower portions of the case, each of the first and second PCBs having openings corresponding to respective ones of the accommodating areas;
   a plurality of tabs connected to the battery cells through the openings in the first and second PCBs, the tabs connected to the battery cells through the openings in the first PCB being physically disconnected from each other, and the tabs connected to the battery cells through the openings in the second PCB being physically disconnected from each other; and
   a battery management system (BMS) on a side surface of the case, wherein the first and second PCBs include pattern portions and wherein:
   first ends of the pattern portions of the first PCB are connected to respective ones of the tabs corresponding to the first PCB and second ends of the pattern portions of the first PCB are at a first pattern collecting portion at the side surface of the case, and
   first ends of the pattern portions of the second PCB are connected to respective ones of the tabs corresponding to the second PCB and second ends of the pattern portions of the second PCB are at a second pattern collecting portion at the side surface of the case.

2. The battery pack as claimed in claim 1, wherein each of the tabs include:
   a base portion contacting a respective one of the battery cells,
   at least one connecting portion extending from a circumference of the base portion, and
   a flange portion extending from the at least one connecting portion in a different direction and to be mounted on the a respective one of the first or second PCBs.

3. The battery pack as claimed in claim 2, further comprising:
soldering portions connected to respective ones of the flange portions,
wherein the first ends of the pattern portions and corresponding ones of the tabs are electrically connected by the soldering portions, respectively.

4. The battery pack as claimed in claim 2, wherein the openings of the first and second PCBs are substantially equal to or greater than sizes of the base portion of each of the tabs.

5. The battery pack as claimed in claim 1, wherein the BMS has connectors electrically connected to respective ones of the pattern collecting portions.

6. The battery pack as claimed in claim 5, wherein the connectors are at upper and lower portions of the BMS, respectively.

7. The battery pack as claimed in claim 1, further comprising:
extending portions respectively extending at predetermined lengths along circumferences of upper and lower surfaces of the case.

8. The battery pack as claimed in claim 7, wherein circumferences of the upper and lower surfaces of the case include guide areas for respective ones of the pattern collecting portions.

9. The battery pack as claimed in claim 1, wherein the openings in each of the first and second PCBs have different sizes based on polarities of corresponding ones of the battery cells.

10. The battery pack as claimed in claim 9, wherein the openings corresponding to positive polarity are smaller than the openings corresponding to negative polarity.

11. A battery pack, comprising:
a case;
a plurality of battery cells;
a plurality of first contacts;
a plurality of second contacts;
a battery management system (BMS); and
a first circuit board connected to first terminals of the battery cells through the first contacts, the first circuit board connected to the BMS;
a second circuit board connected to second terminals of the battery cells through the second contacts, the second circuit board connected to the BMS, wherein the battery cells, the first and second circuit boards, the first and second contacts, and the BMS are in the case, wherein the first contacts connected to respective ones of the first terminals of the battery cells are physically disconnected from each other, and wherein the second contacts connected to respective ones of the second terminals of the battery cells are physically disconnected from each other.

12. The battery pack as claimed in claim 11, wherein a surface of the first circuit board and an outer surface of a rim of the case are substantially coplanar.

13. The battery pack as claimed in claim 11, wherein:
the first circuit board has a plurality of first holes,
the first contacts are coupled to respective ones of the first holes, and
the first contacts connect conductive lines on the first circuit board to respective ones of the first terminals of the battery cells.

14. The battery pack as claimed in claim 13, wherein the first holes have substantially equal size.

15. The battery pack as claimed in claim 13, wherein the first holes have different sizes.

16. The battery pack as claimed in claim 13, further comprising:
a connector coupled to one of the BMS or the conductive lines on the first circuit board; and
pins connected to the other of the BMS or the conductive lines on the first circuit board and coupled to the connector.

17. The battery pack as claimed in claim 16, wherein:
the first circuit board has an extension,
the extension includes one of the pins or the connector; and
the extension is coupled to a recess in a circumference in the case.

18. The battery pack as claimed in claim 13, wherein:
the second circuit board has a plurality of second holes,
the second contacts are coupled to respective ones of the second holes, and
the second contacts connect conductive lines on the second circuit board to respective ones of the second terminals of the battery cells.

* * * * *